(12) United States Patent
Payne et al.

(10) Patent No.: US 8,229,622 B2
(45) Date of Patent: Jul. 24, 2012

(54) DATA RECORDER AND STORAGE SYSTEM FOR LINE REPLACEABLE UNIT

(75) Inventors: David A. Payne, Phoenix, AZ (US); Steve Scott, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 1155 days.

(21) Appl. No.: 12/022,705

(22) Filed: Jan. 30, 2008

(65) Prior Publication Data

US 2009/0192668 A1 Jul. 30, 2009

(51) Int. Cl.
*G01M 17/00* (2006.01)

(52) U.S. Cl. .......................................... 701/35
(58) Field of Classification Search ......................... None
See application file for complete search history.

(56) References Cited

U.S. PATENT DOCUMENTS

| | | | |
|---|---|---|---|
| 4,135,246 A | 1/1979 | McMannis | |
| 5,552,987 A | 9/1996 | Barger et al. | |
| 7,039,509 B2 * | 5/2006 | Podowski | 701/35 |
| 2003/0187554 A1 * | 10/2003 | Henry et al. | 701/29 |
| 2004/0176887 A1 * | 9/2004 | Kent et al. | 701/30 |
| 2005/0043870 A1 | 2/2005 | Joshi et al. | |
| 2005/0148327 A1 | 7/2005 | Perez et al. | |
| 2005/0149238 A1 | 7/2005 | Stefani et al. | |
| 2005/0156777 A1 * | 7/2005 | King et al. | 342/29 |
| 2005/0187677 A1 * | 8/2005 | Walker | 701/16 |
| 2006/0103546 A1 * | 5/2006 | Salser et al. | 340/870.02 |
| 2006/0112119 A1 * | 5/2006 | Vian et al. | 707/101 |
| 2007/0277538 A1 | 12/2007 | Buck | |
| 2009/0172288 A1 * | 7/2009 | Sukegawa | 711/128 |

OTHER PUBLICATIONS

EP extended search report, EP 09151146.9-1229/2085933 dated Aug. 5, 2012.

* cited by examiner

*Primary Examiner* — Thomas Tarcza
*Assistant Examiner* — Nagi Murshed
(74) *Attorney, Agent, or Firm* — Ingrassia Fisher & Lorenz, P.C.

(57) ABSTRACT

A data recorder is configured to be mounted to a line replaceable unit (LRU) and utilized in conjunction with a service monitor. The data recorder includes a memory, a processor coupled to the memory and configured to store operational data pertaining to the LRU in the memory, and a monitor interface coupled to the memory. The monitor interface is configured to be coupled to the service monitor to permit access to the operational data stored in the memory.

16 Claims, 3 Drawing Sheets

DATA RECORDER AND STORAGE SYSTEM FOR LINE REPLACEABLE UNIT

TECHNICAL FIELD

The present invention relates generally to an aircraft's auxiliary power unit and, more particularly, to a data recorder and associated data storage system for recording operational data pertaining to one or more line replaceable units deployed on an auxiliary power unit.

BACKGROUND

Auxiliary power units (APUs) are commonly deployed on aircraft to provide an efficient source of electrical power, pressurized air, and/or hydraulic pressure. A representative APU includes a housing in which an engine (e.g., a gas turbine engine), an engine control unit (ECU), and an electrical generator are disposed. The ECU controls various operational parameters of the engine, which, in turn, drives the generator to produce electricity. A number of modular components, commonly referred to as "line replaceable units" or simply "LRUs," are removably mounted to the APU and perform various functions. A non-exhaustive list of LRUs includes heat exchangers, pumps (e.g., oil pumps, fuel pumps and fuel controls, etc.), cooling fans, valves (e.g., surge control valves, fuel metering valves, bleed air valves, etc.), starter motors, transducers (e.g., temperature transducers, pressure transducers, etc.), ignition control units, and wiring harnesses. The ECU is a readily-replaceable component of the APU and may thus also be considered an LRU. LRUs are distinct from the core components of the APU (e.g., the compressor sections, the combustor section, and the turbine sections of a gas turbine engine) due to their ability to be individually replaced during routine maintenance procedures. Indeed, over its operational lifetime, a single LRU may be deployed upon a number of different APUs and, therefore, a number of different aircraft.

It is desirable to monitor operational data pertaining to line replaceable units for multiple reasons. Inspection and maintenance milestones may be based upon an LRU's accumulated operating time (referred to herein as "operating hours" or simply "hours") or an LRU's accumulated cycles (e.g., start cycles, thermal cycles, etc.). An LRU's accumulated operating hours and cycles may also determine whether or not a manufacturer's warranty is still in force. In addition to operational data, it may also be desirable to monitor certain environmental conditions (e.g., temperatures, vibrations, pressurizes, etc.) to which an LRU is exposed for warranty and diagnostic purposes (e.g., failure analysis).

LRU operational data is conventionally monitored via manual record keeping procedures (e.g., the creation of handwritten log books or computer data files). However, due to the modular nature of LRUs, conventional manual record keeping procedures are time consuming, costly, and subject to human error. If available, a manually-created record may be inaccurate or incomplete and consequently may be of little use in verifying of a warranty claim or locating a recalled LRU. Furthermore, conventional record keeping procedures do not provide a means for monitoring characteristics (e.g., temperatures, vibrations, pressures, etc.) of an LRU's operational environment.

It should thus be appreciated that it would be desirable to provide an LRU data recorder and storage system capable of storing operational data and, perhaps, identification and maintenance information pertaining to one or more line replaceable units. Preferably, such a data recorder and storage system would also be capable of monitoring and storing data relating to the characteristics of the environment in which the LRU operates. Finally, it would also be desirable to provide a data recorder and storage system capable of storing maintenance and identification information relating to the LRU, the host APU (e.g., the APU serial number), and/or the aircraft on which the LRU is deployed (e.g., the aircraft tail number). Other desirable features and characteristics of the present invention will become apparent from the subsequent Detailed Description and the appended claims, taken in conjunction with the accompanying drawings and this Background.

BRIEF SUMMARY

In a first exemplary embodiment, a data recorder is configured to be mounted to a line replaceable unit (LRU) and utilized in conjunction with a service monitor. The data recorder includes a memory, a processor coupled to the memory and configured to store operational data pertaining to the LRU in the memory, and a monitor interface coupled to the memory. The monitor interface is configured to be coupled to the service monitor to permit access to the operational data stored in the memory.

In a second exemplary embodiment, a data storage system is provided for use in conjunction with an auxiliary power unit having at least one line replaceable unit (LRU) mounted thereto. The operation of the LRU is controlled, at least in part, by command signals issued by an LRU controller. The data storage system includes a wireless signal generator and a data recorder mounted to the LRU. The wireless signal generator includes a wireless transmitter and a generator processor coupled to the LRU controller. The generator processor is configured to cause the wireless transmitter to generate wireless signals indicative of the command signals issued by the LRU controller. The data recorder includes a memory, a wireless receiver configured to receive the wireless signals generated by the wireless transmitter, and a recorder processor coupled to the memory and the wireless receiver. The recorder processor is configured to store in the memory operational data pertaining to the LRU derived from the wireless signals generated by the wireless transmitter.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
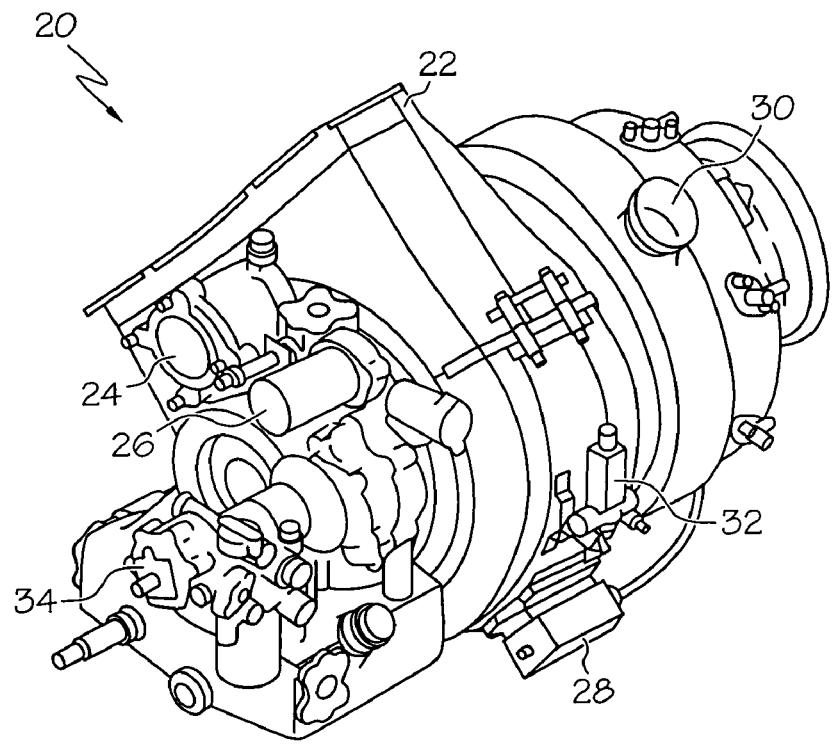
FIG. 1 is an isometric view of an exemplary auxiliary power unit having a plurality of line replaceable units mounted thereto.

FIG. 1 is an isometric view of an exemplary auxiliary power unit (APU) 20 suitable for deployment onboard an aircraft. APU 20 includes a housing 22 containing a gas turbine engine (not shown) and a generator (also not shown). During operation of APU 20, the gas turbine engine drives the generator to provide electrical power to electrical systems onboard the host aircraft. APU 20 also provides compressed air to various systems onboard the aircraft. A plurality of modular components, commonly referred to as "line replaceable units" or "LRUs," is removably mounted to APU 20. In the exemplary embodiment illustrated in FIG. 1, six such LRUs are shown: namely, a starter motor 24, an oil pump 26, an ignition unit 28, a bleed air valve 30, a solenoid 32, and a fuel control unit 34. Although not shown in FIG. 1, APU 20 may have additional LRUs removably mounted thereto including, but not limited to, one or more heat exchangers, oil pumps, fuel pumps, cooling fans, surge control valves, starter motors, sensors (e.g., temperature transducers), fuel flow divider valves, ecology valve systems, and wiring harnesses.

As APU 20 operates, the various LRUs deployed on APU 20 accumulate operating hours and successive operating cycles. For example, each instance starter motor 24 is utilized to initiate the gas turbine engine deployed within housing 22, motor 24 accumulates an additional start cycle. As noted above, it is desirable to track LRU operational data, including hours and cycles, for maintenance and warranty purposes. To this end, each of the LRUs deployed on APU 20 may be equipped with a data recorder of the type described below in conjunction with FIGS. 2 and 3.

Figure 2:
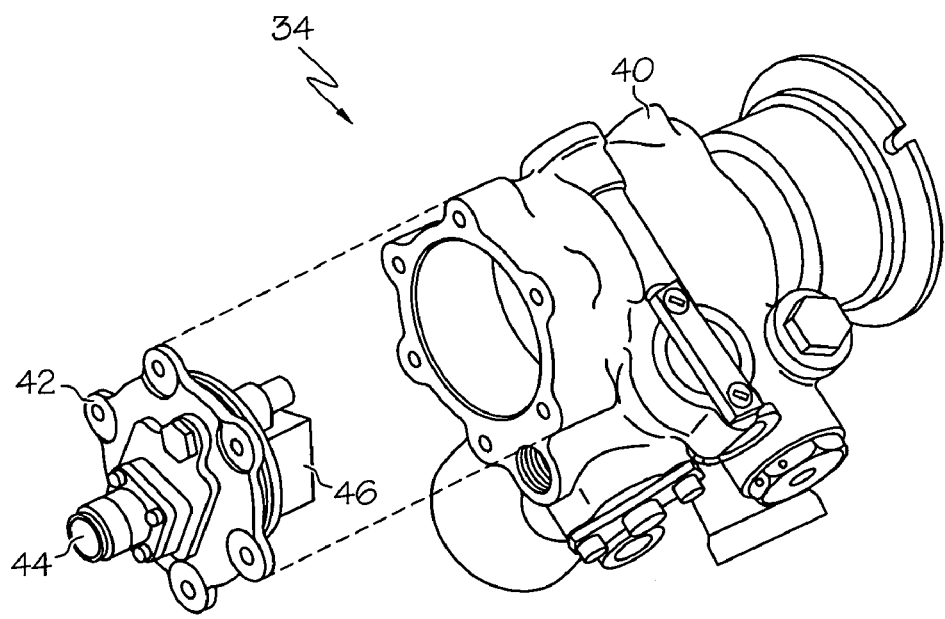
FIG. 2 is an exploded view of a line replaceable unit shown in FIG. 1 to which a data recorder is mounted in accordance with an exemplary embodiment.

FIG. 2 is an exploded view of fuel control unit 34 equipped with a data recorder 46 in accordance with an exemplary embodiment of the present invention. Fuel control unit 34 and data recorder 46 may be collectively referred to as a "line replaceable unit assembly." Fuel control unit 34 comprises a main flowbody 40 to which an end cap 42 is removably attached utilizing a plurality of bolts or other such fasteners (not shown). An electronic fuel metering valve 44 is mounted to end cap 42. During operation of fuel control unit 34, fuel metering valve 44 adjusts the flow area of an orifice to control the rate of fuel flow through flowbody 40. LRU data recorder 46 is preferably integrated into the fuel control unit housing (e.g., flowbody 40). In the exemplary embodiment shown in FIG. 2, LRU data recorder 46 is mounted to an interior surface of end cap 42. Due to the positioning of data recorder 46, recorder 46 is hidden from view when fuel control unit 34 is fully assembled. This decreases the likelihood of tampering and thus helps to ensure the integrity of the data stored on data recorder 46. To further decrease the likelihood of tampering, it is preferred that LRU data recorder 46 is permanently affixed to end cap 42 or to another internal structure of fuel control unit 34 by way of, for example, riveting, gluing, attachment utilizing a tamper-resistant fastener, soldering, or welding. In addition, LRU data recorder 46 may be equipped with tamper-resistant devices, such as tamper-evident seals or interlock circuitry. Data recorder 46 is preferably manufactured as a solid state device for added durability.

Figure 3:
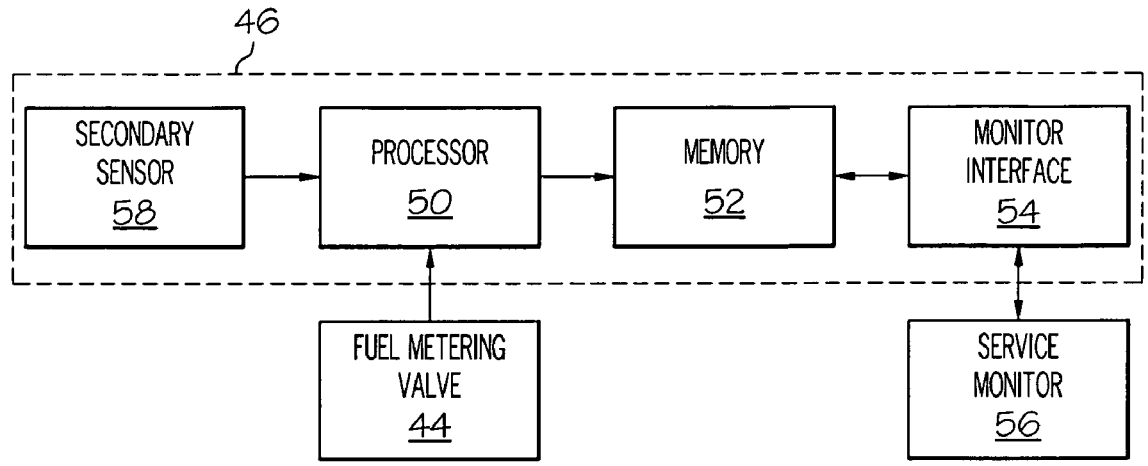
FIG. 3 is a block diagram of the exemplary LRU data recorder shown in FIG. 1.

FIG. 3 is a simplified block diagram of exemplary LRU data recorder 46. As indicated in FIG. 3, LRU data recorder 46 comprises a processor 50, a memory 52, and a monitor interface 54. Memory 52 is preferably non-volatile and includes a first input coupled to processor 50 and a second input coupled to monitor interface 54. LRU data recorder 46, and specifically processor 50, is electrically coupled to fuel metering valve 44 of fuel control unit 34 (e.g., processor 50 may be wired directly to fuel metering valve 44). Processor 50 utilizes this electrical coupling to determine when fuel metering valve 44 is active and thereby track the number of operating hours accumulated by fuel control unit 34. Specifically, processor 50 may be configured to monitor the current provided to, the voltage applied across, or the electromagnetic field created by fuel metering valve 44. In one embodiment, processor 50 comprises a basic comparator circuit that is configured to compare the voltage applied across fuel metering valve 44 to a predetermined threshold voltage. If the voltage applied across fuel metering valve 44 exceeds the threshold voltage (e.g., 5 volts), processor 50 determines that fuel metering valve 44 is active. Thus, by monitoring the time period during which the voltage applied across fuel metering valve 44 exceeds the threshold voltage, processor 50 may track the operating hours of fuel metering valve 44. Processor 50 writes the operating hours of fuel metering valve 44 into memory 52, which then stores the operational data for subsequent technician access. For security purposes, processor 50 may encrypt the operational data written into memory 52 utilizing, for example, public- or private-key encryption techniques.

In a preferred embodiment, LRU data recorder 46 is further equipped with a secondary sensor 58 configured to monitor at least one characteristic of the environment in which fuel control unit 34 (FIG. 2) operates. Secondary sensor 58 may assume the form of a vibration sensor, a temperature sensor, a pressure sensor, a wear sensor, or the like. An output of secondary sensor 58 is coupled to processor 50, which stores data in memory 52 relating to the environmental characteristic detected by sensor 58. For example, if secondary sensor 58 assumes the form of an accelerometer suitable for measuring the vibrational forces, processor 50 may be configured to write into memory 52 the intensity and/or duration of vibrations experienced by fuel control unit 34. Processor 50 may be configured to write this information into memory 52 at predetermined intervals or, instead, only when the measured characteristic exceeds a predetermined threshold value (e.g., when the vibrations exceed a predetermined amplitude or frequency threshold). The stored environmental characteristic data can later be accessed by a technician in the manner described below and utilized for diagnostic purposes, such as failure analysis.

Although LRU data recorder 46 is described herein as being mounted within the housing of fuel control unit 34 (FIGS. 1 and 2) and monitoring the operational time of fuel metering valve 44 (FIG. 2), it will be readily appreciated that LRU data recorder 46 may be deployed on or mounted within other LRUs (e.g., starter motor 24, oil pump 26, ignition unit 28, bleed air valve 30, or solenoid 32 shown in FIG. 1) and utilized to monitor other operational characteristics of the host LRU. For example, LRU data recorder 46 may be mounted within starter motor 24 (FIG. 1) and configured to monitor and record the cumulative number of start cycles performed by motor 24. In this case, LRU data recorder 46 may be electrically coupled (e.g., wired) to an internal electrical system of starter motor 24 and configured to tally successive start cycles by monitoring when a current is delivered to starter motor 24 sufficient to activate motor 24.

It should be appreciated from the foregoing description that exemplary LRU data recorder 46 is deployed on a host line replaceable unit (e.g., fuel control unit 34 shown in FIGS. 1 and 2) and configured to store operational data (e.g., operating hours and/or cycles), and possibly environmental characteristics (e.g., temperatures, vibrations, and/or pressures), pertaining to the host LRU. A technician may access the data stored on memory 52 utilizing a service monitor 56, which may comprise any device suitable for communicating with (or through) monitor interface 54 to read memory 52. In a first group of embodiments, monitor interface 54 assumes the form of an electrical connector (e.g., a D-subminiature connector, a multi-pin USB connector, etc.) that may be physically connected to a mating connector provided on service monitor 56. In a second group of embodiments, monitor interface 54 assumes the form of a wireless (e.g., radiofrequency) transceiver suitable for communicating with a second wireless transceiver provided within service monitor 56. If data stored on memory 52 is encrypted, service monitor 56 is provided with the appropriate means (e.g., a private key) for decrypting the stored data.

LRU data recorder 46 is preferably configured to permit bidirectional communication between memory 52 and service monitor 56 such that monitor 56 may be utilized not only to access data stored in memory 52 but also to write information into memory 52. In this manner, a technician may utilize service monitor 56 to create a service log within memory 52 indicative of the date of serving, the location of servicing, the maintenance procedures performed, or other such maintenance data pertaining to the host LRU. Similarly, when LRU data recorder 46 is initially installed on a host LRU, information identifying the host LRU (e.g., a serial number, date of manufacture, place of manufacture, etc.) may also be stored on memory 52. Such identification information may later be accessed and utilized to determine if, for example, the host LRU has been recalled or flagged by the manufacturer. Still further examples of data that may be stored on memory 52 include information pertaining to the host APU (e.g., APU serial number) and information pertaining to the host aircraft (e.g., aircraft tail number).

There has thus been described an exemplary embodiment of an LRU data recorder suitable for storing the operational data pertaining to a host LRU. In the above-described exemplary embodiment, the LRU data collected operational data itself utilizing a processor and/or a secondary sensor (e.g., a vibration, temperature, or pressure sensor). In alternative embodiments, however, the LRU data recorder need not collect the LRU operational data directly; instead, the LRU operational data may be provided wirelessly to the LRU via a wireless signal generator. To further illustrate this point, an exemplary data storage system that includes a wireless signal generator and a group of LRU data recorders will now be described in conjunction with FIGS. 4 and 5.

Figure 4:
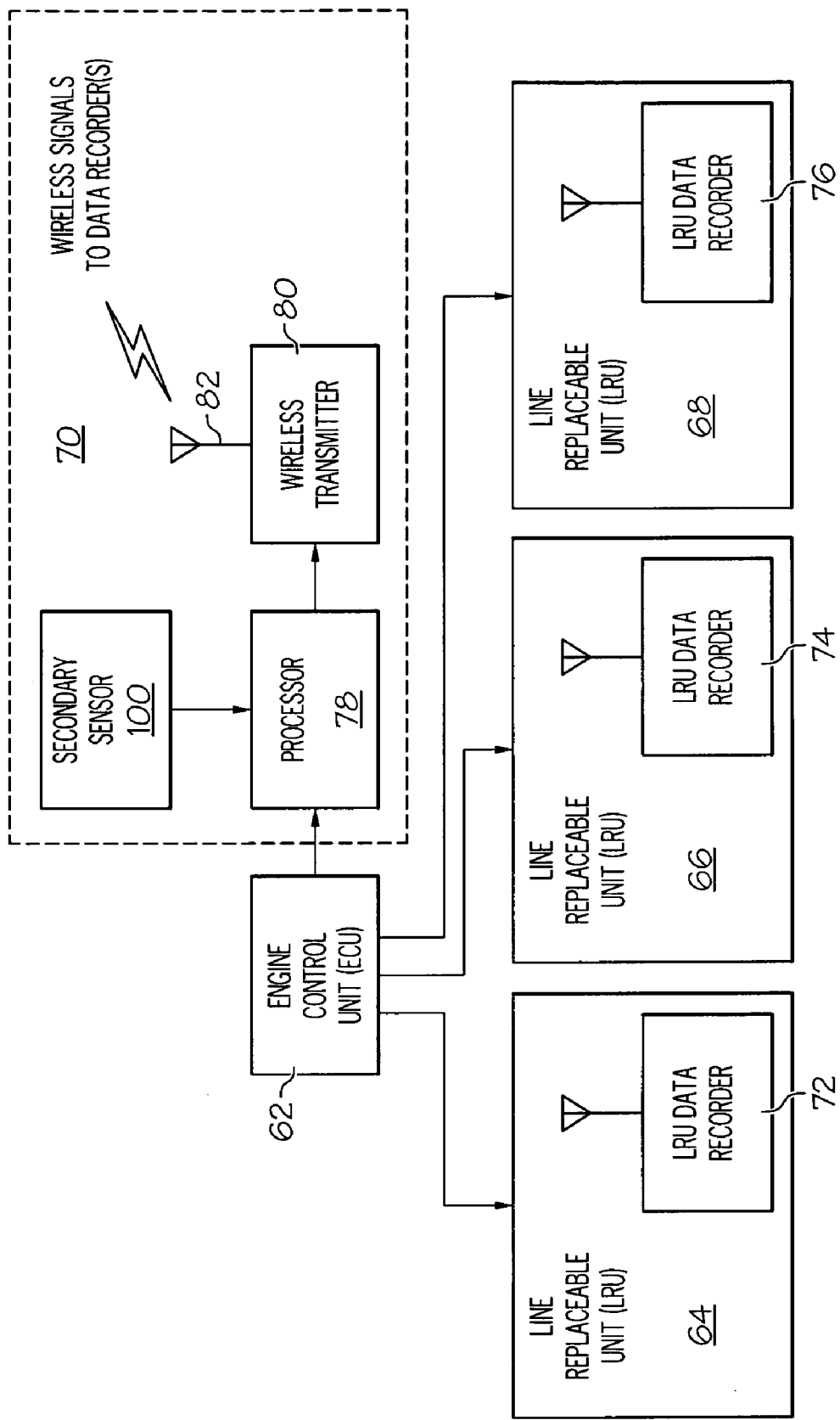
FIG. 4 is a block diagram of a data storage system including a wireless signal generator and a plurality of LRU data recorders, each deployed on a different line replaceable unit, in accordance with a further exemplary embodiment.

FIG. 4 is a block diagram of an exemplary data storage system 60 for use in conjunction with an auxiliary power unit (e.g., APU 20 shown in FIG. 1) that supports a plurality of line replaceable units. Data storage system 60 comprises a wireless signal generator 70 and a plurality of LRU data recorders, which may include, for example, a first data recorder 72, a second data recorder 74, and a third data recorder 76. Data recorders 72, 74, and 76 are each deployed on a different LRU. For example, and as illustrated in FIG. 4, data recorder 72 may be fixedly mounted to a first LRU 64, data recorder 74 may be fixedly mounted to a second LRU 66, and data recorder 76 may be fixedly mounted to a third LRU 68. LRUs 64, 66, and 68 are each removably mounted to the host APU. An engine control unit (ECU) 62 is also mounted to the host APU and operatively coupled to LRUs 64, 66, and 68. During operation of the host APU, ECU 62 periodically sends command signals to each of LRUs 64, 66, and 68 to control their respective functions.

Wireless signal generator 70 comprises a processor 78 and a wireless (e.g., radiofrequency) transmitter 80 having an antenna 82. Wireless signal generator 70 may be electrically coupled (e.g., wired) to, and draw power from, the internal electrical system of the host auxiliary power unit. Processor 78 includes an input and an output, which are operatively coupled to ECU 62 and wireless transmitter 80, respectively. During operation of the host APU, processor 78 causes wireless transmitter 80 to generate wireless signals indicative of the command signals sent from ECU 62 to LRUs 64, 66, and 68. Data recorders 72, 74, and 76 receive the wireless signals generated by transmitter 80 and derive therefrom operational data pertaining to their respective LRUs. Recorders 72, 74, and 76 then store this operational data in their respective memories for subsequent technician access. If desired, wireless signal generator 70 may also be configured to wirelessly transmit data identifying the auxiliary power unit (e.g., the APU serial number) to which data recorders 72, 74, and 76 are removably coupled. This information may later be helpful in determining the service history of LRUs 64, 66, and 68, which may be interchanged between multiple auxiliary power units during their operational lifetimes. Due to the proximity of wireless signal generator 70 and data recorders 72, 74, and 76, a wireless transmitter having a relatively limited transmission range may be utilized as wireless transmitter 80 thus reducing overall production costs. Similarly, the range of wireless transmitter 80 may be intentionally limited to the decrease the likelihood of interference with nearby wireless devices, such as a second data storage system deployed on another aircraft.

Figure 5:
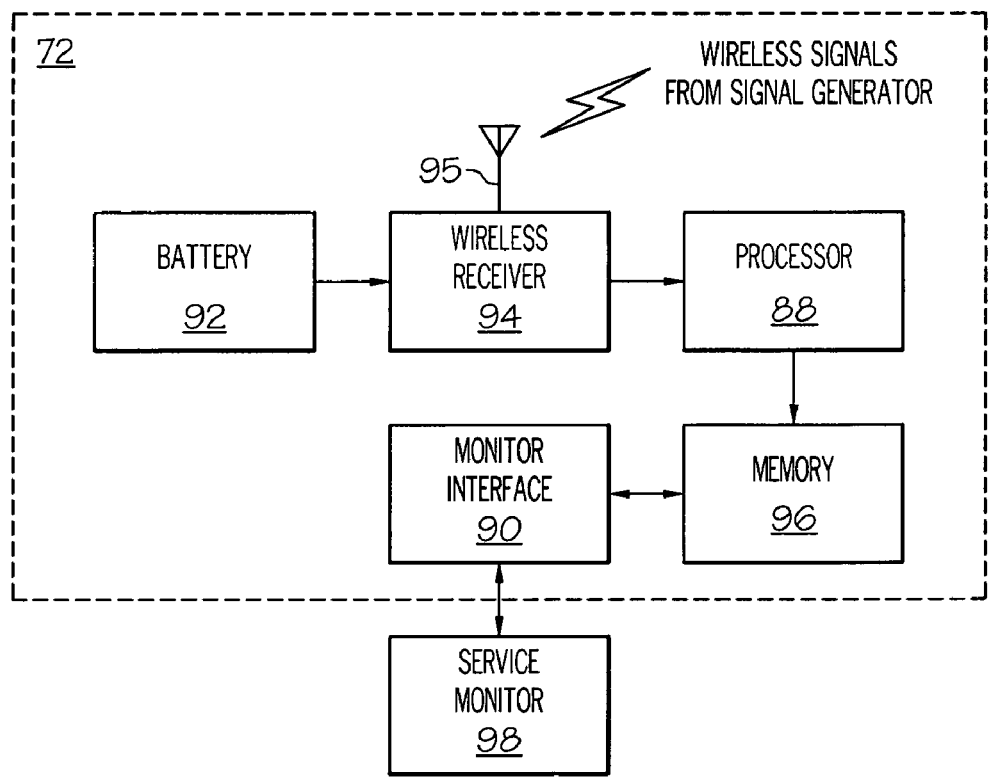
FIG. 5 is a block diagram of one of the exemplary LRU data recorders shown in FIG. 4.

FIG. 5 is a block diagram illustrating the components of LRU data recorder 72 in greater detail. In the exemplary embodiment shown in FIG. 5, LRU data recorder 72 employs components similar to those employed by data recorder 46 (FIGS. 2 and 3); e.g., LRU data recorder 72 includes a memory 86 having a processor 88 and a monitor interface 90 operatively coupled thereto. However, in contrast to data recorder 46, LRU data recorder 72 further includes a battery 92 and a wireless receiver 94 having an antenna 95. Wireless receiver 94 is adapted to receive the wireless signals emitted by wireless signal generator 70 and relate the received signals to processor 88. Processor 88 receives the emitted wireless signal via wireless receiver 94, derives therefrom the current operational status of LRU 64, and then stores this operational data within memory 96. A technician may subsequently access the operational data stored within memory 96 utilizing a service monitor 98, which communicates with memory 96 via monitor interface 90 in the previously described manner.

As should be gathered from the foregoing description, LRU data recorder 72 does not directly monitor the hours and/or cycles of LRU 64, but instead derives operational data pertaining to LRU 64 from the wireless signals provided by wireless signal generator 70. To permit LRU data recorder 72 to operate without being electrically coupled to LRU 64 and thereby simplify installation, LRU data recorder 72 may be provided with an independent power source, such as battery 92 shown in FIG. 5. In addition, recorder 72 may be configured such that processor 88 is powered, at least in part, by current induced in the antenna 95 by the wireless signals generated by signal generator 70.

Referring once again to the exemplary embodiment shown in FIG. 4, wireless signal generator 70 is further provided with a secondary sensor 100 configured to monitor a characteristic of the environment in which LRUs 64, 66, and 68 operate. Sensor 100 may assume the form of, for example, a vibration sensor, a temperature sensor, a pressure sensor, or a wear sensor. Processor 78 is coupled to secondary sensor 100 and configured to cause wireless transmitter 80 to generate a wireless signal including data relating to the monitored environmental characteristic. Data recorders 72, 74, and 76 may then receive this wireless signal and write the corresponding data into their individual memories (e.g., memory 96 of data recorder 72 shown in FIG. 5). The stored environmental characteristic data can later be accessed utilizing a service monitor in the manner previously described for diagnostic purposes.

In view of the above, it should be appreciated that there has been provided multiple exemplary embodiments of a data recorder that is capable of storing operational data and, perhaps, identification and maintenance information pertaining to a line replaceable unit. In certain embodiments, the LRU data recorder is also capable of monitoring and storing data relating to the environmental conditions to which an LRU is exposed during operation. If desired, the data recorder may further be utilized to store maintenance and identification information pertaining to the LRU, the host APU (e.g., the APU serial number), and/or the aircraft on which the LRU is deployed (e.g., the aircraft tail number). It should also be appreciated that there has been provided an exemplary embodiment of a data storage system that may be utilized to record operational data pertaining to multiple of LRUs deployed on a single APU.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A data recorder mounted to a line replaceable unit (LRU) and configured to be utilized in conjunction with a wireless signal generator and with a service monitor having a private key, the data recorder comprising:
   a memory contained within the LRU;
   a sensor integrated into the LRU and configured to monitor a characteristic of the operational environment of the LRU;
   a processor coupled to the memory and to the sensor, the processor configured to store data provided by the sensor and relating to the environmental characteristic of the LRU in an encrypted format readable with the private key;
   a monitor interface coupled to the memory and configured to be coupled to the service monitor to permit access to the operational data stored in the memory; and
   a wireless receiver coupled to the processor and configured to relate thereto signals received from the wireless signal generator describing at least one operational characteristic of the LRU.

2. A data recorder according to claim 1 wherein the LRU includes an electrical component, and wherein the processor is electrically coupled to the electrical component and configured to monitor at least one operational characteristic of the LRU.

3. A data recorder according to claim 1 wherein the sensor comprises a temperature sensor.

4. A data recorder according to claim 1 wherein the sensor comprises a vibration sensor.

5. A data recorder according to claim 1 wherein the sensor comprises a pressure sensor.

6. A data recorder according to claim 1 wherein the sensor comprises a wear sensor.

7. A data recorder according to claim 1 wherein the monitor interface comprises an electrical connector.

8. A data recorder according to claim 1 wherein the monitor interface comprises a wireless transceiver.

9. A data recorder according to claim 1 wherein the data recorder is configured to permit maintenance data to be written into the memory via the service monitor.

10. A data recorder configured to be utilized in conjunction with a service monitor and to be mounted to a line replaceable unit (LRU) having an internal electrical system, the data recorder comprising:
    a processor coupled to the memory and comprising a comparator circuit electrically coupled to the internal electrical system of the LRU, the comparator circuit configured to determined when the LRU is operational;
    a sensor integrated into the LRU and configured to monitor a characteristic of the operational environment of the LRU;
    a memory deployed on the LRU and configured to store operational data pertaining to the operation of the LRU and to further store data pertaining to the operational environment of the LRU;
    a monitor interface coupled to the memory, the monitor interface configured to permit the service monitor to access the operational data stored in the memory;
    wherein the data recorder is further configured to be utilized in conjunction with a wireless signal generator, and wherein the data recorder further comprises a wireless receiver coupled to the processor and configured to relate thereto signals received from the wireless signal generator describing at least one operational characteristic of the LRU.

11. A data recorder according to claim 10 wherein data recorder is fixedly coupled to an internal surface of the LRU.

12. A data storage system for use in conjunction with an auxiliary power unit having at least one line replaceable unit (LRU) mounted thereto, the operation of the LRU influenced by command signals issued by an LRU controller, the data storage system comprising:
    a wireless signal generator, comprising:
        a wireless transmitter;
        a sensor configured to monitor a characteristic of the environment in which the LRU operates; and
        a generator processor coupled to the LRU controller, the generator processor configured to cause the wireless transmitter to generate wireless signals indicative of the command signals issued by the LRU controller and including data related to the characteristic; and
    a data recorder mounted to the LRU, the data recorder comprising:
        a memory;
        a wireless receiver configured to receive the wireless signals generated by the wireless transmitter; and
        a recorder processor coupled to the memory and the wireless receiver, the recorder processor configured to store in the memory operational data pertaining to the LRU derived from the wireless signals generated by the wireless transmitter.

13. A data storage system according to claim 12 wherein the data storage system is configured to be utilized in conjunction with a service monitor, and wherein the data recorder further comprises a monitor interface configured to communicate with the service monitor to enable access to the operational data stored in the memory.

14. A data storage system according to claim 12 further comprising a wireless transceiver including the wireless receiver and the monitor interface.

15. A data storage system according to claim 12 wherein the wireless signal generator is configured to produce a wireless signal including data identifying the particular auxiliary power unit on which the data storage system is deployed.

16. A data storage system according to claim 12 wherein the sensor is selected from the group consisting of a temperature sensor, a pressure sensor, a vibration sensor, and a wear sensor.

* * * * *